United States Patent Office 2,867,495
Patented Jan. 6, 1959

2,867,495
PROCESS FOR PRODUCING CHLOROTRIFLUOROETHYLENE FIBERS

Robert L. Myers, Schenectady, N. Y., assignor to General Electric Company, a corporation of New York No Drawing. Application May 11, 1953
Serial No. 354,398

10 Claims. (Cl. 18—54)

This invention is concerned with a new and useful method of extruding polymeric chlorotrifluoroethylene. More particularly, the invention is concerned with a process of making filaments or fibers of chlorotrifluoroethylene homopolymer by extrusion from a hot solution thereof in a liquid organic solvent maintained at a temperature considerably below the decomposition temperature of the polymer.

One of the objects of this invention is to provide a new method of extruding polymeric chlorotrifluoroethylene.

A further object of the invention is to obtain improved filaments or fibers of polymeric chlorotrifluoroethylene having a small diameter and an appreciable tensile strength.

A still further object of this invention is to prepare a mono-filament of a chlorotrifluoroethylene homopolymer having a high softening point at least above 210° C.

It has been known heretofore that polymeric chlorotrifluoroethylene articles could be prepared by extrusion or drawing from a melt. However, such methods have the disadvantage of requiring high temperatures. Since it is necessary to heat the polymer to 275° or above to obtain an extrudable form, extensive degradation of the molecular weight of the polymer invariably occurs.

I have now discovered unexpectedly that by employing a particular combination of conditions, I am able to obtain from a chlorotrifluoroethylene homopolymer, particularly one having a softening point above 210° C., a filament or fibre having a very small diameter and considerable tensile strength. These results are obtained by effecting solution of a chlorotrifluoroethylene homopolymer in a liquid solvent heated to a temperature below the decompositon temperature of the polymer and allowing the polymer to extrude through a suitable orifice in filament form. Generally, extrusion can be effected by utilizing as a solvent a material which has a boiling point below the extrusion temperautre, so that the autogenous pressure of the solvent expels the polymer solution through the orifice. For those solvents having boiling ranges above the extrusion temperaure, auxiliary pressure must be applied to the extrusion system, either through admission of compressed gases, such as nitrogen or argon, or by applying mechanical pressure from a piston, pump, or other pressure creating device.

Generally, the organic solvents or mixture of organic solvents which can be used in the process of my invention must be capable of dissolving the aforementioned polymer at elevated temperatures but below the decomposition temperature of the polymer. Generally, these solvents are liquids boiling below 140° C.

Although I prefer carbon tetrachloride, other solvents within the scope of my invention include, for example, methyl chloroform, toluene, certain alkylated, preferably liquid, aromatic hydrocarbons, for instance, mixed xylenes, etc.

Another class of fluorinated organic liquids which have been found eminently suitable in preparing the solutions comprises fluorinated-chlorinated aliphatic hydrocarbons of the $C_3$ and $C_4$ series containing at least two chlorine atoms. Among such compounds may be mentioned 1-fluoro-2-methyl-1,1,2-trichloropropane; 1,1-difluoro-2-methyl-1,2,3-trichloropropane; 1,1,1,4,4,4-hexafluoro tetrachlorobutane; 3,3-difluorotetrachloropropene-1; 1,1,2,3-tetrachloro-2,3,8-trifluoropropane; tetrachloro-1,1,3,3-tetrafluoropropane, etc.

I have found also that I can employ mixtures of many of the foregoing solvents advantageously. With regard to mixtures of fluorinated solvents for the polymeric chlorotrifluoroethylene, it has been found that in general they dissolve the polymer at temperatures between the solution temperatures of the individual components. In certain cases it was found, however, that some mixtures were observed to dissolve the polymer at temperatures lower than the solution temperature of either component alone. Solvents which by themselves dissolve the polymer below about 130° C., in general, do not exhibit this phenomenon, but most solvents which by themselves dissolve the polymer about 130° C. show a minimum in the solubility temperature composition curve. This type of mixture can be of practical significance because it makes possible the use of a high percent of a low cost solvent at a reasonably low temperature.

Although the specific shape or size of the chlorotrifluoroethylene polymer employed may be varied, a preferred embodiment of my invention comprises utilizing a polymer which has been pulverized or ground to a relatively fine particle size, for instance, from 10 to 100 mesh. However, if the solvation period is not a critical factor, larger particle sizes may be employed with equally satisfactory results.

In general, the instant invention may be realized by mixing the chlorotrifluoroethylene polymer with a selected solvent for the polymer and introducing the resulting mixture into a suitable container. Solution is effected by heating and stirring the mixture for a period determined by the solvent selected. Fibres or filaments are then obtained by expelling the hot solution through a suitable orifice which may be a single die or a spinneret.

The ratio, by weight, or organic solvent and finely divided polymer may be varied within wide limits depending upon the properties of the solvent selected. Thus, I may advantageously employ, by weight, from 0.01 to 1 or more parts of the polymer per part of solvent. A range which I have found useful comprises, by weight, from about 0.05 to 0.3 part polymer per part of solvent. On a percentage basis, good results may be realized when the polymer comprises about 5 to 15 percent, by weight, of the solvent. In any event, the viscosity of the solution must lend itself to expulsion from a die.

The chlorotrifluoroethylene homopolymers coming within the scope of my invention are the higher molecular weight solid polymers. Generally, the polymers whose softening points are above 210° C. are preferred. Especially good polymers useful for the instance process are those having softening points above 220° C., e. g., from 220° to 270° C. or higher, and which under pressure sinter to clear specimens at 220° to 230° C. Polymers of this description may be prepared in accordance with the process described and claimed in Roedel, 2,613,202, assigned to the assignee of the present invention.

An important condition necessary for the practice of my invention is that of maintaining a proper pressure for the extrusion. In a preferred embodiment wherein carbon tetrachloride is employed as solvent the vapor pressure of the carbon tetrachloride alone is sufficient to expel the solution through the aforementioned orifice in the form of a fine filament or fibre. Other solvents having boiling points substantially lower than the filament formation temperature need little or no auxiliary pressure to expel the solution through the orifice. For solvents boiling near or above the filament formation temperature, auxiliary pressure in addition to that supplied by the solvent vapor such as provided by admission of high pressure nitrogen, argon, etc., to produce the desired pressure, is usually necessary. Alternatively, mechanical pressure may be applied to the solution to supplement the pressure supplied by the vapor pressure of the solvent.

One of the most important advantages of my claimed process of preparing polymeric chlorotrifluoroethylene filaments resides in the fact that relatively low temperatures can be employed as compared to other known processes of preparing filaments by extrusion or drawing from a melt. As mentioned previously, it has generally been found necesary to heat the polymer to 275° C. or above to obtain an extrudable form resulting in extensive degradation of the molecular weight of the polymer. In my process, I may use temperatures considerably below the decomposition temperature of the polymer. Thus, I may use any temperature range above the solution temperature of the chlorotrifluoroethylene polymer in the selected solvent but below the polymer decomposition temperature. A preferred range of temperature, for instance, when carbon tetrachloride is the solvent, is from about 125–175° C.

The time within which the process may be consummated can, of course, be varied within wide limits depending, for example, on the concentration of solvent to polymer ratio, temperature employed, rate of agitation, etc. Generally, times of the order of from 30 minutes or more are necessary to effect solution. Shaking has been found to accelerate solvation.

In order that those skilled in the art may better understand how the present invention may be practiced, the following example is given by way of illustration and not by way of limitation. All parts are by weight.

Example 1

This example illustrates the effect of the vapor pressure of the solvent alone to effect extrusion. In this example, the apparatus consisted of a stainless steel cylinder equipped with a stainless steel needle valve having a .006 inch orifice attached to the outer side of the valve. Five parts of finely divided chlorotrifluoroethylene polymer, pulverized in accordance with the aforedescribed method, and 45 parts of carbon tetrachloride were introduced into the cylinder and the apparatus assembled. The unit was placed in an oven kept at 175° C. until solution was effected, about 30 minutes, the unit being shaken occasionally to accelerate the solution process. At the end of this period the hot cylinder was removed from the oven and the valve opened. A mono-filament of chlorotrifluoroethylene polymer, substantially free of solvent, extruded very rapidly and was collected. Examination of a twenty foot length of this filament revealed that it was fibrous, could be elongated extensively, had a somewhat cellular structure, and a diameter of approximately 1 mil (.001").

A sample of the above-described filament was heated for approximately 5 minutes at 225° C. resulting in a clear, bubble free mono-filament, approximately ⅕ the diameter of the original sample, or the order of 0.2 mil (.0002"). These filaments or fibres have a tensile strength of approximately 10,000 to 20,000 lbs. per square inch (at break) and may be oriented by stretching.

The foregoing example illustrates clearly the advantage in employing my newly discovered process for producing polymeric chlorotrifluoroethylene filaments or fibres. Although prior art methods for extruding the instant polymer have been previously discussed above, it cannot be overemphasized that these prior methods generally require temperatures in excess of the polymer degradation temperature, 275–300°, to obtain an extrudable form.

The solution technique employed in my invention, especially in the example above, permits obtaining fine filaments or fibres at temperatures at least one hundred degrees below the decomposition temperature of the polymer.

It will, of course, be apparent to those skilled in the art that conditions of filament extrusion other than those used in the foregoing example may be employed without departing from the scope of the invention. The concentration of polymer to solvent may be varied within the limits previously described; the solvation period, the application of pressure, temperatures, employed, etc., are all functions of the selected solvent. Similarly, the process may be performed in any suitable container provided with one or more orifices.

The polymeric filaments or fibres prepared in accordance with my method find a large number of valuable applications. Because of their substantial chemical inertness, they are ideally suitable for applications requiring resistance to various chemical reactants. Thus, they can be used to manufacture filters, filter cloths, etc., for general laboratory application as well as all purpose fabrics for the chemical industries, for example, as protective laboratory garments; battery separators, etc. If desired, the filaments may be substituted for fibre glass in many of its presently known applications. They may also be used as packing in valve stems and pumps, and for gland packing of various types.

What I claim as new and desire to secure by Letters Patent of the United States is:

1. The process for the production of mono-filaments from chlorotrifluoroethylene homopolymers having a softening point above about 210° C. which comprises the steps of preparing a mixture of finely divided chlorotrifluoroethylene homopolymer in a liquid organic solvent boiling below 140° C. said polymer being of small particle size, heating said mixture in a closed container maintained at a temperature above the boiling point of the organic solvent so that super-atmospheric pressures are developed, and below the polymer degradation temperature while preventing flow of said mixture to an orifice connected to said container until a solution of polymer in said organic solvent is effected, opening the passage to said orifice and extruding the dissolved polymer through said orifice into air as a fine mono-filament substantially free of solvent.

2. The process for the production of fine polymeric chlorotrifluoroethylene filaments which comprises the steps of preparing a mixture of finely divided chlorotrifluoroethylene homopolymer in a liquid organic solvent boiling below 140° C., heating the said mixture in a suitable container at a temperature below the polymer degradation temperature while preventing the flow of said mixture to an orifice connected to said container until a solution of polymer in said solvent is produced, opening the passage to said orifice and permitting the dissolved polymer to extrude into air as a substantially solvent free fine filament under the influence of the solvent vapor pressure.

3. The process for the production of mono-filaments from chlorotrifluoroethylene homopolymers having a softening point above about 210° C. which comprises the steps of preparing a mixture of finely divided chlorotrifluoroethylene homopolymer in a liquid organic solvent boiling below 140° C., said polymer being of a small particle size, placing said mixture in a closed container provided with a needle valve having a small orifice, heating said mixture to a temperature above the boiling point of the organic solvent, so that super-atmospheric pressure is developed, and below the polymer degradation temperature until a solution of polymer in said organic solvent is effected, opening said valve and permitting the dissolved polymer to extrude through said orifice into air as a substantially solvent free mono-filament, and heating said mono-filament to eliminate the voids therein, thereby producing a filament of smaller diameter than said first-mentioned mono-filament.

4. The process of extruding mono-filaments from a chlorotrifluoroethylene homopolymer having a softening point of from about 220° to 270° C. which comprises the steps of dissolving 5 to 15%, by weight, of finely divided chlorotrifluoroethylene homopolymer in a liquid organic solvent boiling below 140° C. heated to a temperature above its boiling point but below the polymer degradation temperature, said dissolved polymer being contained in a vessel provided with a valve having a small orifice, opening said valve and permitting said dissolved polymer to extrude, under the influence of the solvent vapor pressure, through said orifice in the form of a substantially solvent free mono-filament and heating said mono-filament to eliminate the voids therein, thereby producing an improved mono-filament of said polymer having a smaller diameter than said first mentioned mono-filament.

5. The process of extruding mono-filaments of a chlorotrifluoroethylene homopolymer having a softening point of from about 220° to 270° C. which comprises the steps of dissolving 5 to 15%, by weight, of finely divided chlorotrifluoroethylene homopolymer having a particle size of the order of 0.2 to 25 microns in carbon tetrachloride heated to a temperature above its boiling point so that super-atmospheric pressures develop but below the polymer degradation temperature, said dissolved polymer being contained in a vessel provided with a valve having a small orifice, opening said valve and permitting the vapor pressure of the carbon tetrachloride to extrude the dissolved polymer in the form of a substantially solvent free mono-filament and heating said mono-filament to about 225° C. to eliminate the voids therein, thereby producing an improved mono-filament of said polymer having a smaller diameter than said first mentioned mono-filament.

6. The process of claim 4 in which the organic solvent is toluene and in which the pressure in the extrusion system is the vapor pressure of the toluene augmented by an auxiliary pressure.

7. The process of claim 4 in which the organic solvent is methyl chloroform.

8. The process of claim 4 in which the organic solvent is carbon tetrachloride.

9. The process of claim 4 in which the organic solvent is toluene.

10. The process of claim 4 in which the organic solvent is xylene and in which the pressure in the extrusion system is the vapor pressure of the xylene augmented by an auxiliary pressure.

References Cited in the file of this patent

UNITED STATES PATENTS

| | | |
|---|---|---|
| 2,023,204 | Munters | Dec. 3, 1935 |
| 2,217,743 | Greenewalt | Oct. 15, 1940 |
| 2,256,483 | Johnston | Sept. 23, 1941 |
| 2,313,296 | Lamesch | Mar. 9, 1943 |
| 2,341,615 | Hoffman | Feb. 15, 1944 |
| 2,541,181 | Welton | Feb. 13, 1951 |
| 2,610,359 | Hatchard | Sept. 16, 1952 |
| 2,642,333 | Tomonari | June 16, 1953 |
| 2,648,095 | Curtis | Aug. 11, 1953 |
| 2,718,511 | Sprung | Sept. 20, 1955 |

FOREIGN PATENTS

| | | |
|---|---|---|
| 578,168 | Great Britain | June 18, 1946 |